US009682313B2

(12) United States Patent
Wilkiewicz et al.

(10) Patent No.: US 9,682,313 B2
(45) Date of Patent: *Jun. 20, 2017

(54) CLOUD-BASED MULTI-PLAYER GAMEPLAY VIDEO RENDERING AND ENCODING

(71) Applicant: Google Inc., Mountain View, CA (US)

(72) Inventors: Jaroslaw Jerzy Wilkiewicz, Menlo Park, CA (US); Daniel Jerome Hermes, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,003

(22) Filed: Jul. 20, 2015

(65) Prior Publication Data

US 2015/0321097 A1  Nov. 12, 2015

Related U.S. Application Data

(63) Continuation of application No. 13/837,493, filed on Mar. 15, 2013, now Pat. No. 9,233,299.

(30) Foreign Application Priority Data

Oct. 3, 2012  (IN) .......................... 4122/CHE/2012

(51) Int. Cl.
*A63F 13/00* (2014.01)
*A63F 13/355* (2014.01)
(Continued)

(52) U.S. Cl.
CPC ............ *A63F 13/00* (2013.01); *A63F 13/355* (2014.09); *A63F 13/5258* (2014.09);
(Continued)

(58) Field of Classification Search
None
See application file for complete search history.

(56) References Cited

U.S. PATENT DOCUMENTS 8,147,339 B1 * 4/2012 Perry .................... A63F 13/355
463/31
8,346,915 B2 * 1/2013 Kies .................... G06F 11/3414
348/231.1
(Continued)

FOREIGN PATENT DOCUMENTS

KR       10-0793311 B1    1/2008
WO    WO 03/047710 A1    6/2003
WO    WO 2012/078640 A2  6/2012

OTHER PUBLICATIONS

PCT International Search Report and Written Opinion, PCT Application No. PCT/US2013/028344, Oct. 1, 2013, eight pages.

*Primary Examiner* — Sunit Pandya
(74) *Attorney, Agent, or Firm* — Fenwick & West LLP (57) ABSTRACT

Generating in real-time multiple gameplay videos in a cloud computing network of a mobile game played on multiple mobile devices is disclosed. A cloud-based video system of the cloud computing network receives gameplay state information of the mobile game played on the multiple mobile devices, where the gameplay state information associated with a mobile device describes the states of the mobile game while the game is played on the mobile device. The video system generates a gameplay map comprising the gameplay observed by the multiple mobile devices. Responsive to a viewer or a virtual director selecting the gameplay associated with a mobile device, the video system generates a gameplay video of the mobile game associated with the mobile device based on encoded audio frames and video frames of the mobile game played on the mobile device.

20 Claims, 7 Drawing Sheets

(51) Int. Cl.
*A63F 13/60* (2014.01)
*A63F 13/5258* (2014.01)
*A63F 13/86* (2014.01)
*A63F 13/92* (2014.01)

(52) U.S. Cl.
CPC .............. *A63F 13/60* (2014.09); *A63F 13/86* (2014.09); *A63F 13/92* (2014.09)

(56) References Cited

U.S. PATENT DOCUMENTS

| | | | | |
|---|---|---|---|---|
| 8,366,552 | B2* | 2/2013 | Perlman | A63F 13/12 463/42 |
| 8,549,091 | B1* | 10/2013 | Evans | H04L 29/06 705/27.1 |
| 8,549,574 | B2* | 10/2013 | Perlman | A63F 13/12 725/110 |
| 9,089,777 | B2* | 7/2015 | Chimes | A63F 13/497 |
| 2006/0224761 | A1* | 10/2006 | Howarth | H04N 21/235 709/231 |
| 2007/0060359 | A1* | 3/2007 | Smith | A63F 13/525 463/42 |
| 2008/0139301 | A1* | 6/2008 | Holthe | A63F 13/00 463/25 |
| 2009/0124387 | A1* | 5/2009 | Perlman | A63F 13/12 463/42 |
| 2009/0131177 | A1* | 5/2009 | Pearce | A63F 13/10 463/43 |
| 2010/0281156 | A1 | 11/2010 | Kies et al. | |
| 2012/0040754 | A1* | 2/2012 | Dutilly | A63F 13/10 463/30 |
| 2014/0155174 | A1* | 6/2014 | Laakkonen | A63F 13/46 463/42 |

* cited by examiner

CLOUD-BASED MULTI-PLAYER GAMEPLAY VIDEO RENDERING AND ENCODING

CROSS REFERENCE TO RELATED APPLICATIONS

This application is a continuation of U.S. application Ser. No. 13/837,493, filed Mar. 15, 2013, which claims the right of priority based on India application serial no. 4122/CHE/2012, filed on Oct. 3, 2012, all of which are incorporated by reference in their entirety.

BACKGROUND

1. Field of Art

Described embodiments relates generally to video compression, and more particularly to processing mobile video gameplays in a cloud-based video processing system.

2. Description of the Related Art

A mobile game is a video game played on a mobile device, such as a mobile phone, personal digital assistant (PDA), tablet computer, portable media player or calculator. The popularity of mobile games has increased along with the significant improvement of mobile devices in terms of storage and graphic capabilities. At the same time, mobile games have become increasingly sophisticated with the technological advances of the mobile devices.

Similar to what has happened to console and personal computer (PC) games, more and more mobile gamers want to share their achievements, fun and tips of playing video games with others in video sharing services, e.g., YOUTUBE™. One way to share games played on a mobile device is by recording a video of the gameplay, and rendering and encoding the video at the mobile device before posting this video in a video sharing service. One challenge for local video rending and encoding is the limitations of computational and power resources of the mobile device, which, in turn, presents serious limitations to the quality and length of the videos that can be created directly on the mobile device. Another challenge is the acceptable processing delay from encoding high quality video directly from the mobile device, where a long delay is expected to degrade user experience.

SUMMARY

A method, system and computer program product provides gameplay video generation in a cloud computing network of a mobile game played on a mobile device.

A mobile game is played on multiple mobile devices (i.e., an instance of the mobile game, or a gameplay session). Various states of the gameplay session of the mobile game associated with a mobile device are captured, including user inputs such as clicks mouse movement, keyboard inputs, timing information of each state, game data, and audio/video information associated with each state and any other user input during the session of the gameplay. A gameplay map is generated, where the gameplay map includes representations of the gameplay observed by the multiple mobile devices, and each gameplay represents a viewing point of the mobile game observed from the mobile device. Responsive to a viewer or a virtual director selecting the gameplay associated with a mobile device, the video system generates a gameplay video of the mobile game associated with the mobile device based on encoded audio frames and video frames of the mobile game played on the mobile device.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
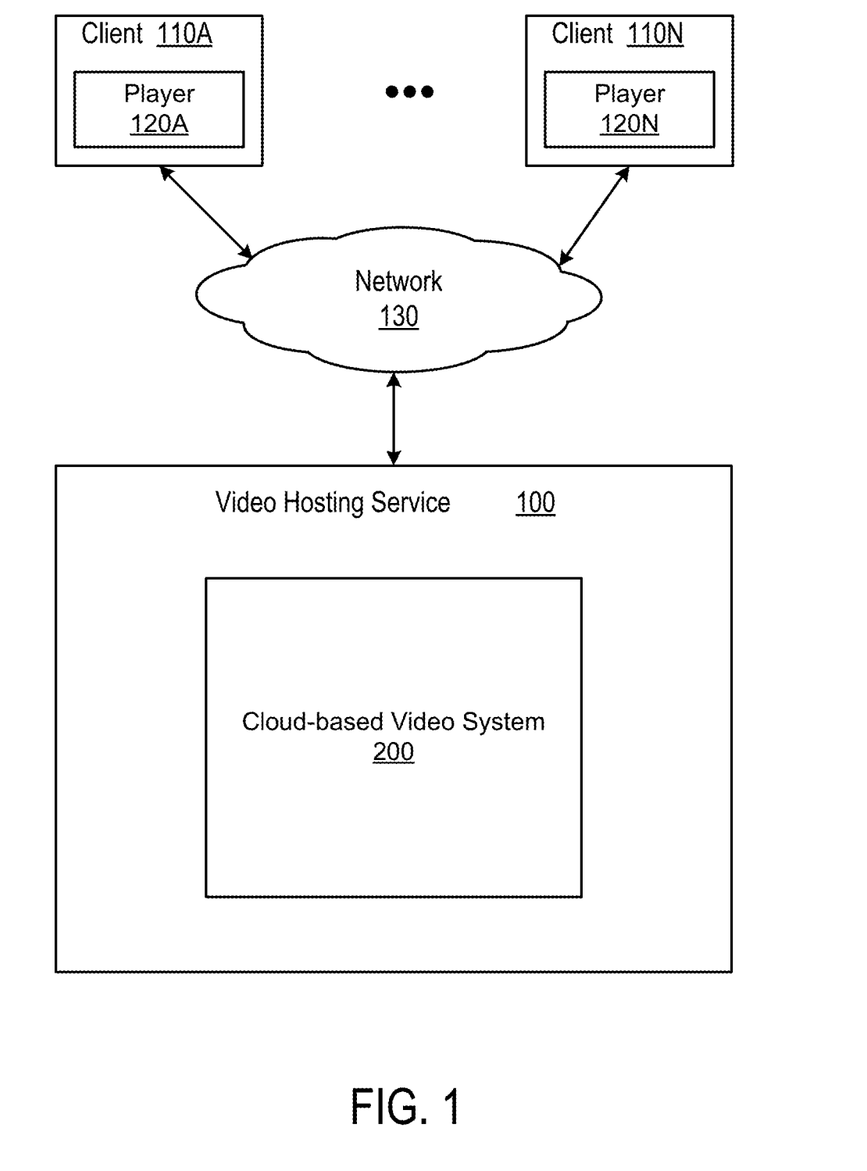
FIG. 1 is a block diagram illustrating a system view of a video hosting service having a cloud-based video system for gameplay video processing.

FIG. 1 is a block diagram illustrating a system view of a video hosting service 100 having a cloud-based video system 200 for gameplay video processing. Multiple users/viewers use client 110A-N to send video hosting requests to the video hosting service 100, such as generating videos of mobile games played on a mobile device and uploading the videos to a video hosting website for sharing, and receive the requested services from the video hosting service 100. To simplify description of embodiments, a video generated from a mobile game played on a mobile device is referred to as a "mobile gameplay video" or "gameplay video" from hereon. A gameplay video is independent of the game rendering, and may include images and content different from that which was rendered to the mobile device during the game. It can include other video/audio content, (e.g., video from other points of view than the players,) and it can include less than all of what was presented at the mobile device. Thus, a gameplay video is independent such that the gameplay video's content can overlap (i.e., share some video, but not necessarily all). The video hosting service 100 communicates with one or more clients 110 via a network 130. The video hosting service 100 receives the video hosting service requests (e.g., mobile gameplay video service) from clients 110, processes the requests by the cloud-based video system 200 and uploads the processed gameplay videos to a video sharing website and/or returns the processed gameplay videos to the clients 110.

Before describing the individual entities illustrated in FIG. 1, the following user case is to illustrate the operations of the cloud-based video system 200 of the video sharing service 100. Assume that Bianca is a casual gamer who likes to play "Vegetable Ninja" video game on her mobile phone. Bianca's mobile phone includes a video game player, such as a GOOGLE PlayN open source game engine. Bianca enables live streaming of her video game before she starts playing or shortly afterward. Once Bianca enables live streaming of her video game, she receives a link to the live video of her game. Responsive to Bianca having the link, she can share it with her friends in a social network or send an email to her friends saying "Hey, watch me play this game now!" When her friends receive the link to the live video of her game, they can open a video player to watch the gameplay in near real-time even though they don't have the game installed on their devices. As Bianca is playing the game, the player of her mobile phone captures the game state of the game into a gameplay state information file as the game progresses. The game state includes Bianca's user inputs, such as clicks, touchscreen gestures, selections, as well as device motions (for games that make use of device orientation and acceleration data), as well as the state of game objects (e.g., points, characters, game level, etc.).

Turning to the individual entities illustrated on FIG. 1, each client 110 is used by a user, such as Bianca, to request and receive video hosting services. For example, a user uses a client 110 to send a request for sharing a gameplay video of a mobile game played on a mobile device. The client 110 can be any type of computer device, such as a mobile telephone, personal digital assistant, IP enabled video player, as well as a personal computer (e.g., desktop, notebook, laptop) computer. The client 110 typically includes a processor, a display device (or output to a display device), a local storage, such as a hard drive or flash memory device, to which the client 110 stores data used by the user in performing tasks, and a network interface for coupling to the system 100 via the network 130.

A client 110 also has a video player 120 (e.g., the Flash™ player from Adobe Systems, Inc., or a proprietary one) for viewing a video stream, and adapted to play games. The video player 120 may be a standalone application, or a plug-in to another application such as a network browser. The player 120 may be implemented in hardware, or a combination of hardware and software. The player 120 is configured to play the gameplay video generated by the cloud-based video system 200. Using the Bianca example described above, when Bianca receives the link to the live stream of the gameplay, she can share the link with her friends, who can watch her play the game on YouTube. All of these implementations are functionally equivalent in regards to the described embodiments.

The player 120 includes user interface controls (and corresponding application programming interfaces) for selecting a video feed, starting, stopping and rewinding a video. Also, the player 120 can include in its user interface a video display format selection configured to indicate which video display format (e.g., a two-dimensional (2D) video or a three-dimensional (3D) video). Other types of user interface controls (e.g., buttons, keyboard controls) can be used as well to control the playback and video format selection functionality of the player 120.

In one embodiment, the client 110 implements an application programming interface (API) for gameplay video processing. The API can be categorized into two categories: data API and state capture API. The data API controls data feeds to the client 110 (e.g., sources of top rated mobile games, most viewed mobile games, etc.), user's playlists, subscriptions and user's comments, contacts feed. The state capture API controls the behavior of the player 120 of the client 110 during game play. The term "game" refers generally to a video game that is played by a user on his/her mobile device, and an instance of such play is referred to as a "gameplay session." For example, the state capture API is invoked to capture various states of the gameplay session of the mobile game played on the client 110, such as clicks, mouse movement, timing information of each state, audio/video frame information associated with each state and any other user input during the session of the game play.

In one embodiment, in response to the user of the client 110 ending a game session (e.g., quitting the game and selecting uploading mobile game button on his/her mobile device), the state capture API compiles the captured gameplay states into a gamestate information file in a JSON (JavaScript Object Notation) format and uploads the gamestate information to a storage (e.g., GOOGLE Cloud Storage) of a cloud-based video system for further processing.

The network 130 enables communications between the clients 110 and the video hosting service 100. In one embodiment, the network 130 is the Internet or a mobile network that connects mobile devices to the Internet, and uses standardized internetworking communications technologies and protocols, known now or subsequently developed that enable the clients 110 to communicate with the video hosting service 100. In another embodiment, the network 130 is a cloud computing network and includes one or more components of the video hosting service 100.

The video hosting service 100 comprises a cloud-based video system 200 for processing gameplay videos from clients 110 in a cloud computing environment. Other embodiments of the video hosting service 100 may comprise other components, such as a video server to process user uploaded videos. The cloud-based video system 200 includes one or more computers executing modules for providing the functionality described herein. Depending on the embodiment, one or more of the functions of the cloud-based video system 200 can be provided in a cloud computing environment. As used herein, "cloud computing" refers to a style of computing in which dynamically scalable and often virtualized computing resources (e.g., processor, memory, storage, networking) are provided as a service over the network 130.

The cloud-based video system 200 receives mobile gameplay state information associated with a gameplay session of a mobile game from the player 120 of the client 110, renders the played mobile game based on the gameplay state information and encodes the played mobile game into a gameplay video in the cloud computing network. The cloud-based video system 200 also uploads the gameplay video to the video hosting service 100 for sharing. In one embodiment illustrated in FIG. 2, the cloud-based video system 200 includes a cloud storage 202, a local storage 204, a renderer 220, an encoder 230, an uploader 240 and a controller 250.

Figure 2:
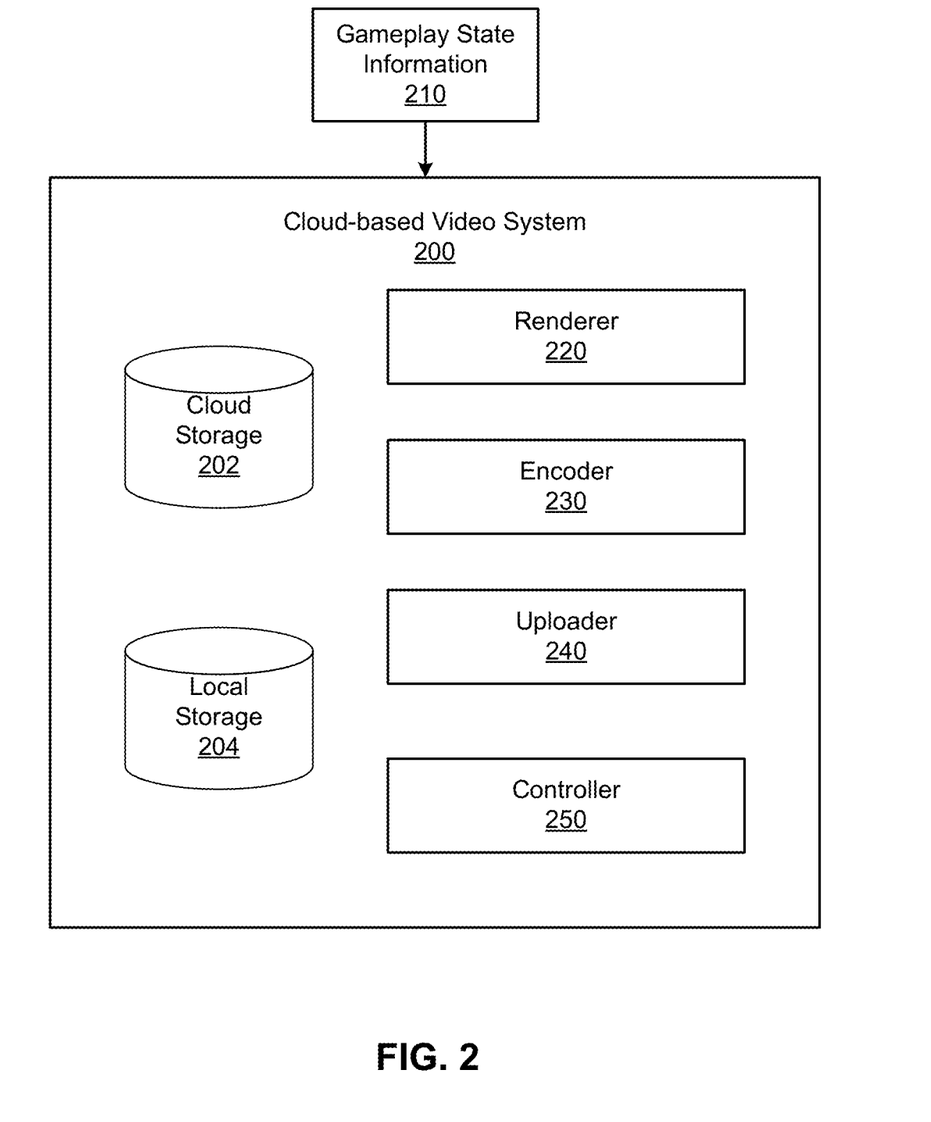
FIG. 2 is a block diagram illustrating computer modules of the cloud-based video system for gameplay video processing.

The cloud storage 202 stores mobile gameplay state information, which is a record of all of the states of a video gameplay session as the game was played on the player 120 of the client 110 during given game session. The state information includes user actions (e.g., click, touch, etc.), as well as timing information of each state, audio/video frame information associated with each state and any other user input during the session of the game play. In another embodiment, the state information includes changes to the model representing the mobile game as a user playing the game.

In one embodiment, the cloud storage 202 is implemented using GOOGLE™ Cloud Storage API for storing and serving data in the cloud storage 202. Data stored in the cloud storage 202 is arranged in a file system format. In one embodiment, the gameplay state information is captured at the client device during the gaming sessions and then transmitted to the cloud-based video system 200. The mobile gameplay state information is stored as a gameplay state file in the cloud storage 202. The gameplay state file also contains the identification of the mobile game, details of the particular gaming session (e.g., date, time, user information, version information), and video metadata (e.g., video title, tags, description the mobile game) associated with the mobile game. The cloud storage 202 also stores encoded audio/video data of the gameplay video for replaying and sharing. The local storage 106 stores gameplay rendering data, which describes reconstructed video and audio representation of the gameplay on the mobile device.

In response to the state capture API at the client 110 uploading the gameplay state information into the cloud-based video system 200, the controller 250 stores the state information in the cloud storage 202 and notifies the renderer 220. The renderer 220 retrieves the gameplay state information stored in the cloud storage 202 and replays the game session including rendering the audio representation (if the mobile game has sound) and video representation of the gameplay based on the gameplay state information.

In one embodiment, the renderer 220 uses native Java binary from a cross platform game engine (e.g., PlayN) and the gameplay state information to replay the user's game and reconstruct audio and video representation of the gameplay. The video representation of the gameplay represents the video content of the gameplay session in video frames. Similarly, the audio representation of the gameplay represents the audio content of the gameplay session in audio frames. In one embodiment, the renderer 220 includes one or more virtual machines (e.g., Linux virtual machines) and renders the audio and video content of the gameplay. The renderer 220 stores the rendered audio and video data in the local storage 204 for further processing by the encoder 230.

The encoder 230 retrieves the rendered gameplay audio and video data from the local storage 204 and encodes the audio and video data into a gameplay video of the mobile game played on the client 110. In one embodiment, the encoder 230 includes an audio encoder to encode the gameplay audio data and a video encoder to encode the gameplay video data. The encoder 230 "stitches" (i.e., puts together) the encoded audio and video data to generate the gameplay video of the mobile game using FFmpeg. The FFmpeg is an open-source software tools that contain libraries and programs for handling multimedia. Other audio and video rendering schemes can be used in other embodiments of the renderer 220.

In one embodiment, the encoder 230 uses the same or different virtual machines used by the renderer 220 for the encoding process in the cloud computing environment. Using different virtual machines affords the encoder 230 with scalability and resiliency in the event of failure of one or more virtual machines. In one embodiment, the encoder 230 encodes the video frames of the gameplay video data in VP8 format and encodes the audio frames of the gameplay audio data in Vorbis format. VP8 encoding is an open source video compression format for high quality real-time video and Vorbis is an open source audio compression format intended for a variety of sample rates (e.g., 8 kHz and 192 kHz) and a range of channel representations (e.g., stereo, 5.1, or up to 255 discrete channels). Other audio and video encoding schemes can be used in other embodiments of the encoder 230.

The encoder 230 generates a gameplay video of the mobile game played on the client 110 based on the encoded audio and video frames of the gameplay. In one embodiment, the encoder 230 generates the gameplay video in WebM format, which is an audio-video format designed to provide open source video compression format for use with HTLM5 videos. The gameplay video in WebM format file consists of VP8 video and Vorbis audio streams of the encoded audio and video data of the gameplay. The encoder 230 stores the gameplay video and video metadata associated with the gameplay video in the cloud storage 202 for uploading to a video sharing service by the uploader 240. The video metadata associated with the gameplay identifies the user (i.e., gamer) of the mobile game and coding parameters (e.g., encoding format of the video/audio data, etc.).

In addition to generating a mobile gameplay video in a 2D format, another embodiment of the cloud-based videos system 200 generates a 3D mobile gameplay video. Even if the player did not play the mobile game in 3D, an additional reconstruction of the gameplay may be an attractive way of sharing one's game achievements. In this example, the renderer 220 analyzes the state file representing the mobile gameplay and determines an appropriate 3D video format for the mobile gameplay video. A 3D video format is typically a 2D video format with 3D specific metadata. The 3D specific metadata describes the manner of the video frames of a 2D video being packed (e.g., left-and-right, or top-and-down) and video format of the 2D video for a 3D video encoding and display. The renderer 220 stores the determined 3D video format in the local storage 204 for 3D gameplay video encoding.

The encoder 230 retrieves the 3D video format and the rendered audio/video data of the mobile gameplay for 3D gameplay video encoding. In one embodiment, the encoder 230 is a VP8 encoder used in WebM-3D encoding scheme. WebM-3D is a combination of a WebM container, VP8 video formation and StereoMode setting. An example of the WebM-3D specification, including the StereoMode setting, can be found at http://www.webmproject.org/code/sepcs/cotnrainter#webm_guidelines. The encoded 3D mobile gameplay video can be displayed with 3D visual effect according to the 3D metadata. The encoder 230 stores the 3D mobile gameplay video in the cloud storage 202 for uploading.

The uploader 240 uploads the generated gameplay video (in 2D or 3D format) of the mobile game to the video hosting service 100. To upload the gameplay video, the uploader 240 retrieves the gameplay video and associated metadata from the cloud storage 202. The uploader 240 uses the user identifier contained in the metadata to verify the user of the mobile game before uploading the gameplay video. The uploader 240 communicates with the video hosting service 100 for the verification, and receives an authorization token associated with the user identifier. Responsive to an invalid authorization token associated with the user identifier, the uploader 240 notifies the user of the client 110 for providing use information for re-verification.

With the metadata of the gameplay video and the authorization token, the uploader 240 fetches the gameplay video and communicates with the video sharing service 100 for the uploading. In one embodiment, the uploader 240 fetches and uploads the gameplay video in a sequence of video chunks, each of which contains a portion of the gameplay video. Responsive to the video sharing service 100 confirms receipt of the uploaded video portion, the uploader 240 continues the uploading until the entire file of the gameplay video is saved in the video hosting service 100. The uploader 240 sends the user with a notification containing a web link to the uploaded video in response to finishing the uploading.

The controller 250 is to control the mobile game processing among the renderer 220, the encoder 230 and the uploader 240 and storage in the cloud storage 202 and the local storage 204. Efficiently processing complex mobile games requests often involves multiple renderers 220, encoders 230 and/or uploaders 240. The controller 250 is further configured to efficiently distribute the requests among the multiple renderers 220, encoders 230 and uploader 240. In one embodiment, the controller 250 is an application engine (e.g., GOOGLE™ App Engine) to control the gameplay video processing.

For example, the controller 250 functions as an URL listener to detect the mobile gameplay state information uploaded to the cloud-based video system 200. Upon the mobile gameplay state information detection, the controller 250 creates a control entry in a database controlled by the controller 250 and notifies the renderer 220 for rendering.

The controller 250 monitors the rendering process of the renderer 220. In response to multiple rendering tasks, the controller 250 queues the rendering tasks for a particular renderer 220 or distributes the rendering tasks among multiple renderers 220. Upon finishing a rendering task, the controller 250 stores the rendered data in the local storage 204 and notifies the encoder 230 for encoding. In one embodiment, the controller 250 distributes the multiple rending tasks based on a load-balancing scheme among the multiple renderers 220 such that the multiple renderers 220 balance the rendering efficiency (e.g., throughput) and computer resources allocated to the renderers 220.

The controller 250 similarly monitors and controls the encoding tasks performed by one or more encoders 230. Upon finishing an encoding task, the controller 250 notifies the uploader 240 for uploading the mobile game video to the video sharing service 100.

Figure 3:
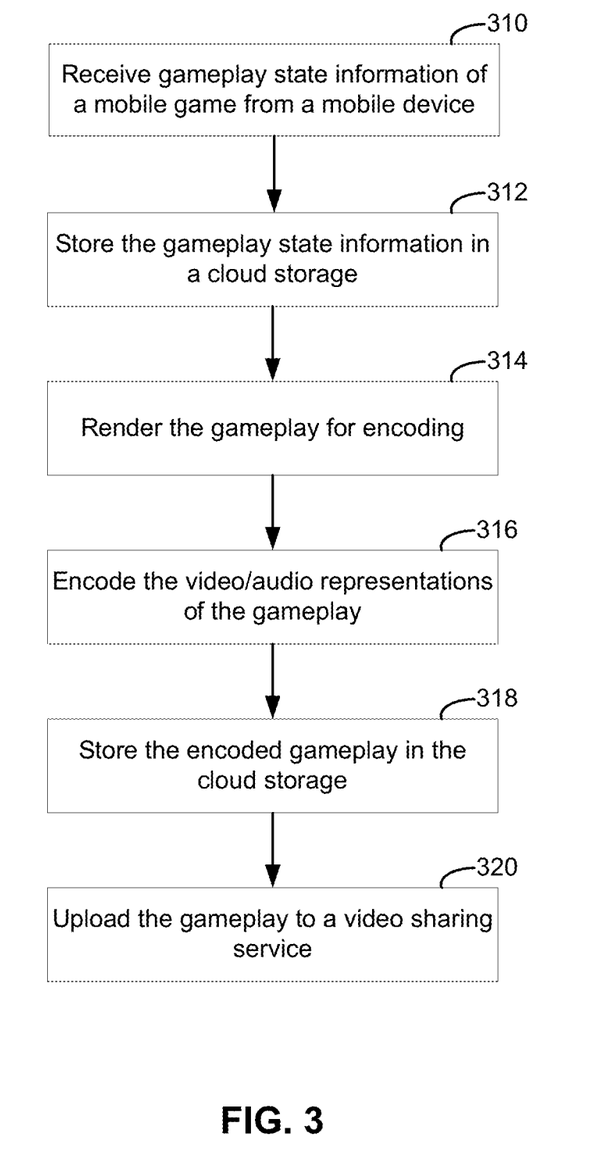
FIG. 3 is a flow chart of generating a gameplay video of a mobile game by a cloud-based video system.

FIG. 3 is a flow chart of processing a gameplay video by a cloud-based video system 200 described above. Initially, the video system 200 receives 310 gameplay state information of a mobile game from a mobile device (e.g., a mobile phone capable of playing video games). The gameplay state information is captured by the player of the mobile device and the game state information includes user information of the mobile device (e.g., user identifier) and user behavior of playing the mobile game (e.g., touch, click, state changes, etc.) The video system 200 stores 312 the gameplay state information in a clouds storage.

The cloud-based video system 200 includes a renderer to retrieve the gameplay state information from the cloud storages and renderers 314 the gameplay in a cloud computing environment by reconstructing audio (if available) and video representations of the mobile game at the corresponding gameplay states described by the gameplay state information. The renderer may include one or more virtual machines to perform the rendering and a controller of the video system 200 controls and distributes the gameplay video processing requests and processing load among the multiple virtual machines. The rendered audio and video data are stored in a local storage of the video system 200.

The cloud-based video system 200 also includes an encoder for generating a mobile gameplay video in a cloud computing environment based on the rendered audio and video representations of the gameplay. For example, the encoder encodes 316 the audio representation of the gameplay in Vorbis format and encodes 316 the video representation of the gameplay in VP8 format. The encoder combines the encoded audio and video data to generate the mobile gameplay video (e.g., WebM or WebM-3D format) and stores 318 the encoded mobile gameplay video in the cloud storage of the video system 200. An uploader of the video system 200 uploads 320 the encoded video to a video hosting service for sharing and notifies the user of the mobile device when the mobile gameplay video is uploaded.

Figure 4:
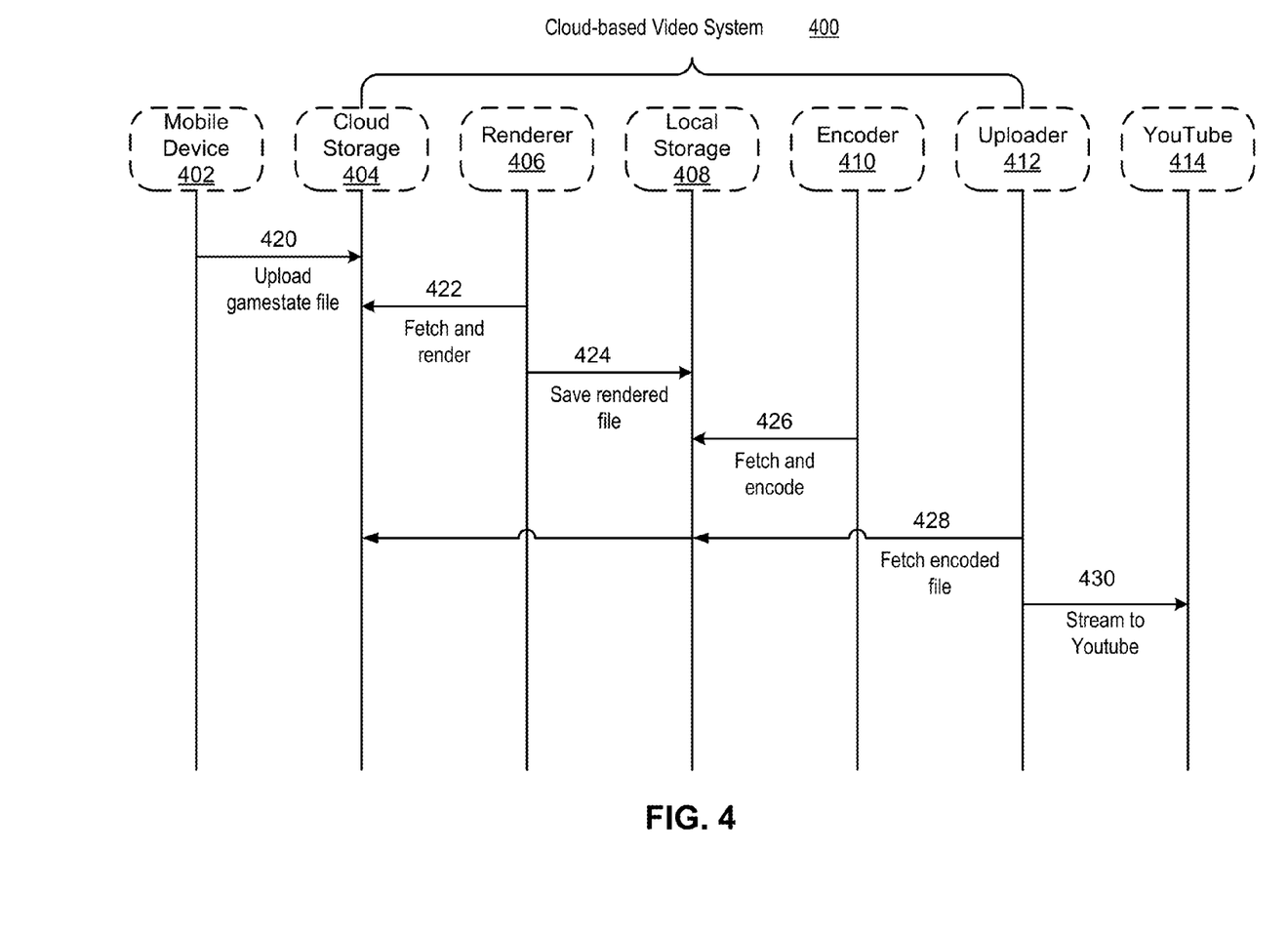
FIG. 4 is an example interaction between components of a cloud-based video system for gameplay video processing.

FIG. 4 is an example interaction between components of a cloud-based video system 400 for gameplay video processing of the Bianca user case described with reference to FIG. 1. Bianca uses a mobile device (e.g., mobile phone) 402 to play her favorite video game. The mobile player 402 records the gameplay state information while Bianca plays the video game. The mobile player 402 uploads 420 the gamestate file to a cloud storage 404 of the cloud-based video system. A renderer 406 of the video system fetches and renderers 422 the gameplay and saves 424 the rendered audio/video data in a local storage 408 of the video system. An encoder 410 of the video system fetches and encodes 426 the rendered audio/video data into a gameplay video. An uploader 412 of the video system fetches 428 the gameplay video from the cloud storage 404 and streams 430 the gameplay video to YOUTUBE™. The cloud video system 400 may comprise a controller (not shown) to monitor the video processing among the various modules of the video system 400.

Described embodiments of gameplay video processing advantageously provide mobile game developers (and potentially console or web game developers) to offload the computationally expensive process of rendering and encoding of the gameplay to a cloud computing environment. For example, the embodiments of gameplay video processing can be applied to web-based gameplay processing, where the gameplay state file of a game run in the browser is created by a browser-resident game engine, sent by the browser to the cloud-based video system for rendering and encoding.

The cloud-based gameplay video processing offers efficient and scalable processing capability and enhanced user experience by allowing gamers to flexibly share their game videos with others. For example, a user can not only upload his/her gameplay video for sharing, but also have the gameplay video streamed in real time by the cloud-based video system. While a gamer plays a mobile game, the cloud-based video system constructs a live video stream based on gameplay state information and uses a video hosting service (e.g., YOUTUBE) to distribute the live video of the gameplay to viewers.

Another application offered by the cloud-based gameplay video processing is multi-platform and multi-player live streaming events processing. For example, comparing with traditional video streaming of a live event having multiple players, the cloud-based video system 200 re-generates the live event viewed from multiple camera angles, each of which represents a viewing perspective of the live event captured by a camera or mobile device. The cloud-based video system 200 provides different viewing points of the live event to viewers in a video hosting service (e.g., YOUTUBE). The users viewing the live event can select a particular viewing point of the live event or a virtual director of the cloud-based video system 200 selects an interesting viewing point of the live. The cloud-based video system 200 provides the rendering, encoding of the selected viewing point and presents the live event from the selected viewing point to the viewer.

Figure 5:
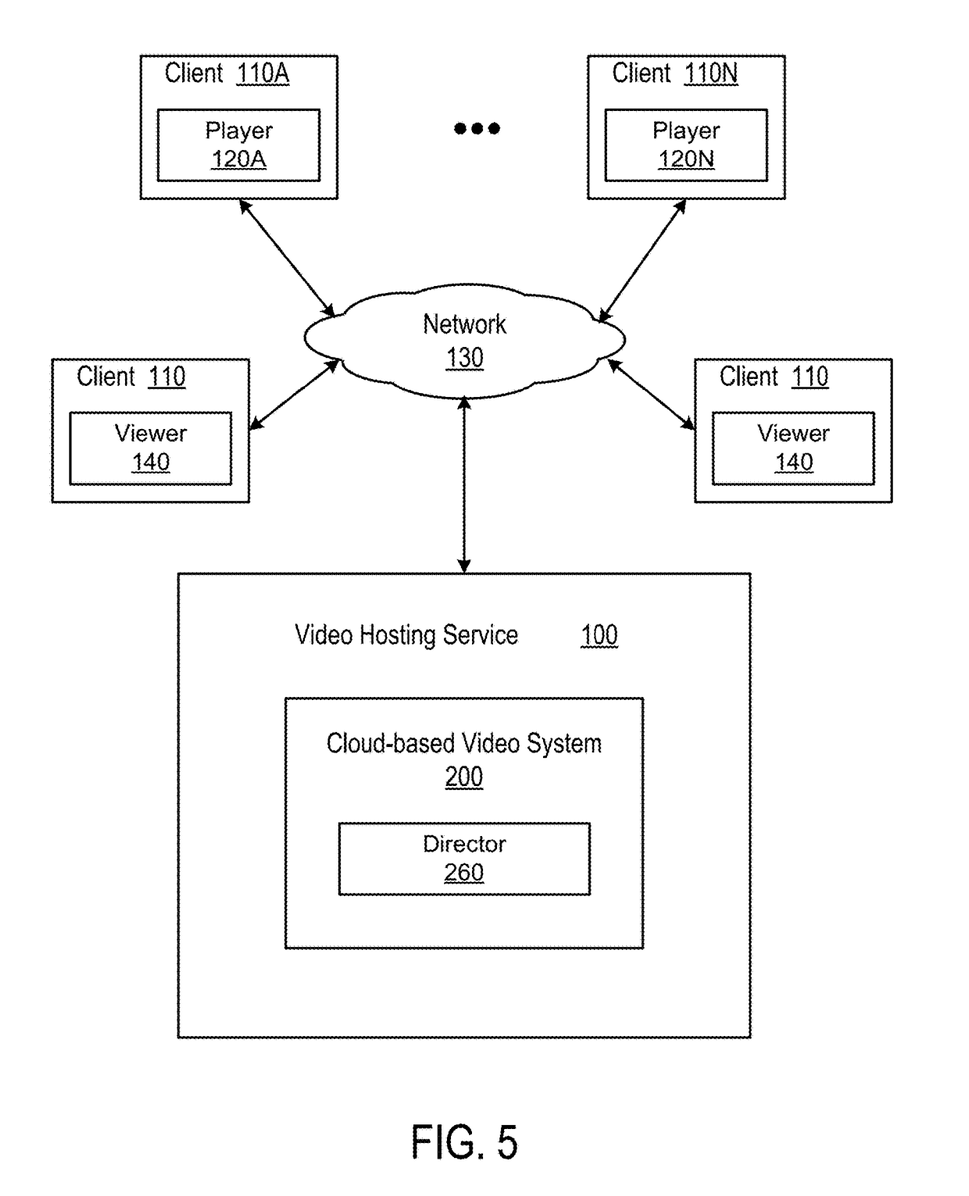
FIG. 5 is a block diagram illustrating a system view of a video hosting service having a cloud-based video system for multiple players gameplay video processing.

FIG. 5 is a block diagram illustrating a system view of a video hosting service 100 having a cloud-based video system for multiple players gameplay video processing. The video hosting service 100 communicates with multiple game players 120 and multiple viewers 140 via a network 130. A game player 120 sends video hosting requests to the video hosting service 100, and receives the requested services from the video hosting service 100. The video hosting service 100 has a cloud-based video system 200 to process the video hosting requests received from the video hosting service 100, such as generating gameplay videos selected by the viewers 140 or a director 260.

For a mobile game simultaneously played by multiple game players 120, the cloud-based video system 200 receives and stores the game state information from each game player. The cloud-based video system 200 generates a gameplay video for each game player 120 for the mobile game played on his/her mobile device. Each of the gameplay video of the mobile game corresponds to a viewing point of the mobile game observed on a game player's mobile device. The process of generating the gameplay video for a game player 120 is similar to the process described with reference to the description of FIGS. 2-4 above. Specifically, the cloud-based video system 200 receives the gameplay state information from a game player, which is captured by the mobile device of the game player, and the game state information includes user information of the mobile device (e.g., device identifier) and user behavior of playing the mobile game (e.g., touch, click, state changes, etc.)

Comparing with gameplay video generation of a mobile game of a single game player described with reference to FIG. 1 and FIG. 2, the cloud-based video system 200 for multiple game players 120 includes an additional module, a director module 260, that is configured to automatically select an interesting viewing point of the mobile game for a viewer 140 from the viewing points captured by the multiple mobile devices of the players. In one embodiment, the director 260 is implemented in a virtual machine of the cloud-based video system 200. The cloud-based video system 200 receives gameplay state information from the multiple players 120, and obtains common state information among the multiple players 120. The director 260 automatically selects an interesting viewing point of the gameplay for gameplay video generation and presents the generated gameplay video to a viewer 140.

In one embodiment, the cloud-based video system 200 continuously receives gameplay state information from the multiple players 120 in real time. In this scenario, the cloud-based video system 200 synchronizes the multiple gameplay state information based on common state information (e.g., a game scene captured by multiple players 120). In another embodiment, the cloud-based video system 200 requests the client devices (e.g., mobile devices of the multiple players 120) periodically send a predetermined amount of their gameplay state information to the director 260. The length of period and amount of gameplay state information requested by the cloud-based video system 200 from the multiple players 120 are configurable design parameters, such as for every 100 milliseconds, each player 120 sending a fixed amount of gameplay state information. The cloud-based video system 200 can adjust the length of period and amount of gameplay state information based on a variety of factors, such as network bandwidth, processing speed and workloads of the director 260.

The cloud-based video system 200 can collect gameplay state information of multi-player mobile games in most commonly used multi-player game designs, e.g., peer-to-peer gameplay and multi-player (more than two player) gameplay. In peer-to-peer gameplay case, the cloud-based video system 200 can request the two players to send their gameplay state information directly to the director 260. In multi-player case, where a third-party game server is often used to collect gameplay state information from the multiple players, the director 260 obtains the gameplay state information of the multiple players from the game server.

From the collected gameplay state information from multiple players, the director 260 automatically selects an interesting viewing point captured by a mobile device of a game player based on a variety of factors. Factors include the status of each player (e.g., the player's score, health, inventory, activity level), the occurrence of specific events (e.g., completion of a scoring event such as football touchdown, baseball homerun, basketball slam dunk, opponent kill in a first person shooter). For example, for a zombie-killing mobile game, the director 260 can select the viewing point of a player who has killed the most zombies (i.e., a highest current score) at the time of selection.

Another factor for selecting point of view is based on order and time allocated to the game players. Taking FIG. 6 as an example, the director 260 initially assigns a predetermined, equal amount of show times to the four game payers 120A-120D and selects the viewing point of a player based on a round-robin scheme, e.g., displaying the viewing point of player 120A for 5 seconds, and followed by the viewing point of player 120B for 5 seconds, the viewing point of player 120C and the viewing point of player 102D, each for 5 seconds.

Figure 6:
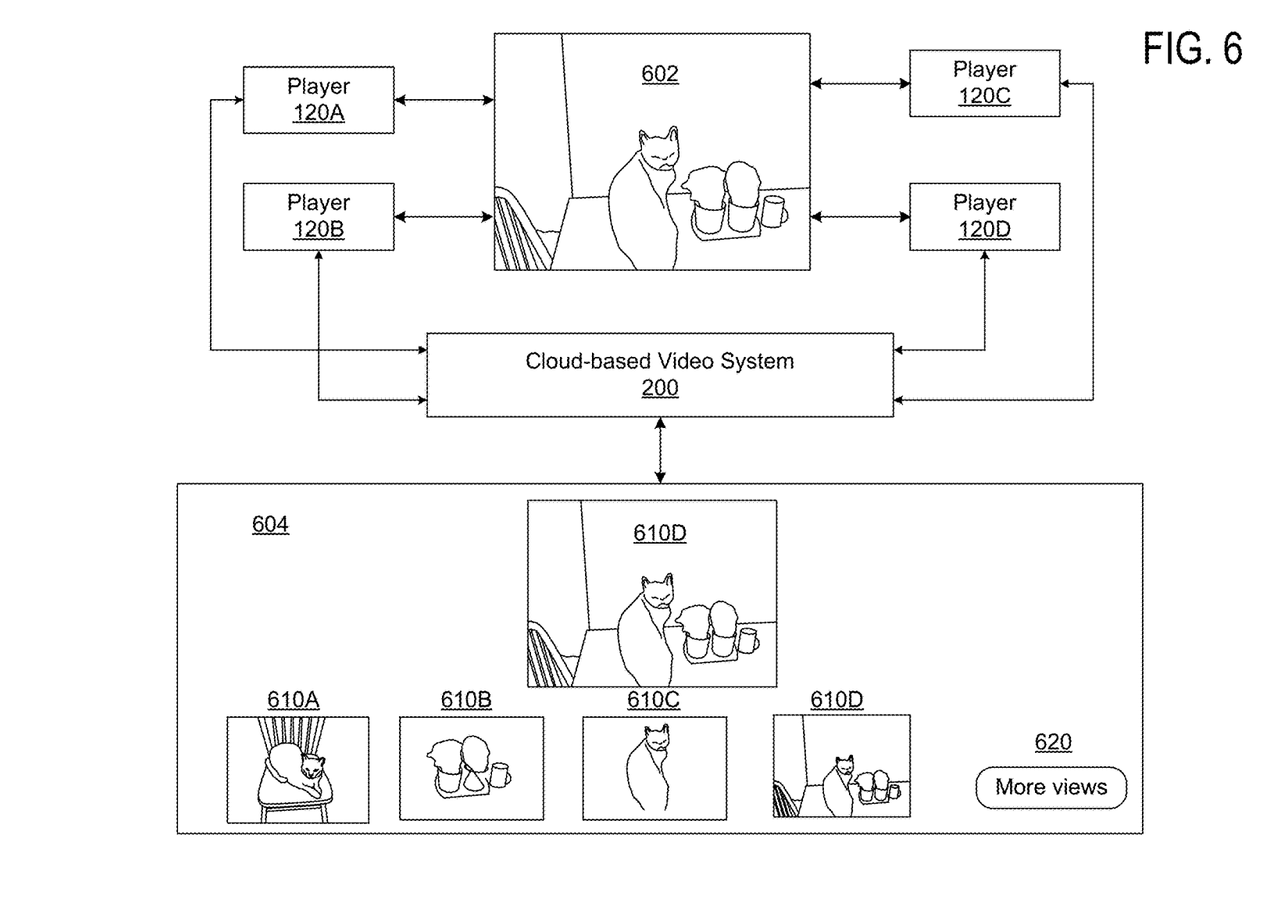
FIG. 6 is an example real-time rendering of a mobile game played by multiple players for a viewer of the rendered gameplay video.

To compensate the selection based on the order and time allocated to the game players, the director 260 may use the performance of each game player, e.g., based on the player's score of performance. The director 260 adjusts the allocated show time to a player based on the player's performance. In one embodiment, the probability of a player to be selected by the director 260 is proportionally based with the player's performance score. For example, the director 260 grants a longer show time to a player who has better performance (i.e., a high performance score) than a player with worse performance. Other embodiments of the director 260 may use other factors to determine the selection.

In response to a viewer or the director 260 selecting the viewing point observed from the mobile device of a game player, the cloud-based video system 200 renderers the gameplay in a cloud computing environment by reconstructing audio (if available) and video representations of the mobile game at the corresponding gameplay states described by the gameplay state information associated with the game player. The cloud-based video system 200 generates a mobile gameplay based on the rendered audio and video representations of the gameplay.

To capture the simultaneous playing of the mobile game by multiple game players 120, the cloud-based video system 200 further generates a virtual gameplay map that contains information identifying each generated gameplay video of the mobile game and its associated game player and/or mobile devices. The gameplay map is an interactive video that can be clicked on by a user. A gameplay map provides another perspective of the gameplay in a form of video. During the course of the gameplay, the gameplay map changes corresponding to the progress of the gameplay. In one embodiment, the director 260 of the cloud-based video system 200 generates the gameplay map based on the collected gameplay state information from the multiple players 120. The gameplay map may further include thumbnail images, each of which represents a rendered gameplay video associated with a game player. The gameplay map may also include ordering information of the rendered gameplay videos for presentation to a viewer. An uploader of the cloud-based video system 200 streams the encoded gameplay videos to the video hosting service 100 for sharing and viewing by one or more viewers 140. The video hosting service 100 or the director 260 may choose one of the encoded gameplay videos as a default gameplay video and displays the gameplay map in terms of multiple thumbnail images of the individual gameplay videos associated with multiple game players.

FIG. 6 is an example of the process flow in real-time rendering of a mobile game played by multiple players for a viewer of the rendered gameplay video. In the example illustrated in FIG. 6, a video game 602 is played by four game players 120A-120D on their mobile devices. For each game player 120, the cloud-based video system 200 renders a gameplay video based on the gameplay state information from the game player, which describes the specific user actions (e.g., clicks, touches) and user/device information (e.g., user identifier). The gameplay state information associated with a game player represents a viewing point of the video game observed by the mobile device of the game player. For example, in response to the viewer selecting the gameplay of game player 120A, the cloud-based video system 200 renders a gameplay video 610A based on the gameplay state information captured by the mobile device of the player 120A.

The cloud-based video system 200 also generates a virtual gameplay map 604 identifying the gameplay video and its associated game player/mobile device, e.g., gameplay video 610A associated with player 120A. The virtual gameplay map includes an encoded gameplay video, e.g., 610D, as the default gameplay image, and also includes a thumbnail image of each individual gameplay video 610A-610D in the gameplay map. In response to the gameplay videos and the gameplay map being uploaded to a video hosting service (e.g., YOUTUBE), the video hosting service displays the default gameplay image 610D and each individual gameplay video 610A-610D in a user interface 604 to share with one or more viewers. A viewer may click a thumbnail image (i.e., 610A-610D) to get a specific viewpoint of the video game played on the mobile device of the player associated with the selected viewpoint.

In another example with reference to FIG. 6, the director 260 automatically selects a viewing point as the most interesting viewing point for a viewer from the four viewing points captured by the mobile devices of the game players. Comparing with a viewer selecting a viewing point, the director 260 has the advantage to access all the available viewing points of the mobile game and is able to select a viewing point that makes the viewing of the mobile game more interesting. Additionally, the director 260 may switch from a viewing point to another viewing point in response to a triggering event, such as a game player achieving a certain event (e.g., killing a zombie). The director 260 can further enhance the user experience by arranging rendered gameplay video associated with the game players in an order which allows the video hosting service 100 to present the most interesting viewing point to a viewer first.

Using FIG. 6 as an example, the director 260 automatically selects the viewing point represented by the gameplay video 610D as the most interesting viewing point among the 4 available viewing points represented by the gameplay videos 610A-610D. The director 260 instructs the video hosting service 100 to present the selected gameplay video 610D to the viewer. The directors 260 also includes the ordering information in the gameplay map, which instructs the video hosting service 100 to presents the gameplay videos in a defined order (e.g., 610D first, followed by 610A, 610B and 610C, then 610D again). In response to a predetermined event of the game play captured by the mobile devices, video 610C, the directors 260 update the ordering, e.g., switching the currently displayed gameplay video 610D with the newly rendered gameplay video 610C.

Figure 7:
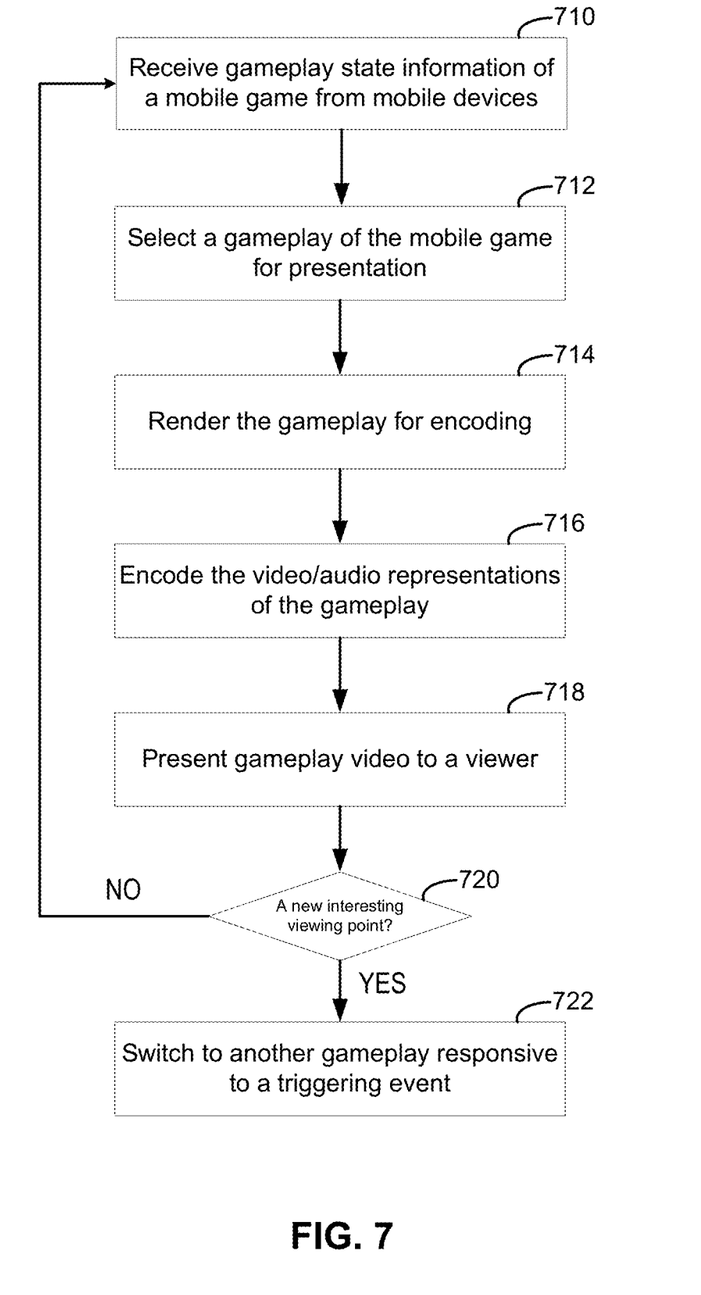
FIG. 7 is a flow chart of a virtual director selecting a gameplay of a mobile game for presentation to a viewer of the mobile game.

FIG. 7 is a flow chart of a virtual director selecting a gameplay of a mobile game for presentation to a viewer of the mobile game. Initially, the virtual director (e.g., the director 260 of the cloud-based video system 200) receives 710 the gameplay state information of the mobile game from multiple mobile devices associated with multiple game players. The director 260 selects 712 a viewing point of the gameplay of the mobile game as the most interesting viewing point and communicates the selection with other modules (e.g., render, encoder) of the video system 200 for rendering the gameplay video of the selected gameplay. Specially, the render 220 of the video system 200 renders 714 the gameplay by reconstructing audio (if available) and video representations of the mobile game at the corresponding gameplay state described by the gameplay state information associated with the selection. The encoder 230 of the video system 200 encodes 716 the audio/video representations of the gameplay into a gameplay video. The director 260 presents 718 or instructs the video hosting service 100 to present the generated gameplay video as the most interesting gameplay at the moment to a viewer. In response to a determination that a new interesting viewing point of the gameplay exists 720, the director 260 selects the new gameplay and switches 722 to the gameplay video of the selected gameplay as the new most interesting gameplay for the viewer.

Allowing a viewer or a virtual director to select a viewing point of the gameplay, the cloud-based video system 200 generates the selected gameplay video in real time and displays it to the viewer. Empowered by the cloud-based gameplay video processing, users can have an enhanced experience of "who-is-where" in a game event.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for injecting 3D metadata into 3D videos at video streaming herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating a gameplay video in a cloud computing network, the method comprising:
   receiving gameplay state information from a computer device, the gameplay state information describing a plurality of states of a mobile game played on the computer device;
   rendering the mobile game played on the computer device to produce a rendered gameplay based on the received gameplay state information by reconstructing a video representation of the gameplay of the mobile game, the video representation of the gameplay representing video content of the gameplay of the mobile game, the rendered gameplay representing a viewing point of the mobile game observed from the computer device; and
   encoding the rendered gameplay to generate a gameplay video of the mobile game played on the computer device based on the rendered gameplay, wherein at least a portion of video content of the generated gameplay video is different from video content of the rendered gameplay.

2. The method of claim 1, wherein the gameplay state information includes changes to a model representing the mobile game played on the computer device.

3. The method of claim 1, wherein rendering the mobile game played on the computer device to produce the rendered gameplay further comprises:
   responsive to the mobile game having sound data, reconstructing an audio representation of the gameplay of the mobile game, the audio representation of the gameplay representing audio content of the gameplay of the mobile game.

4. The method of claim 1, wherein generating the gameplay video comprises:
   encoding audio frames of an audio representation of the gameplay in a two-dimensional format;
   encoding video frames of a video representation of the gameplay in a two-dimensional format; and
   combining encoded audio frames and encoded video frames to generate the gameplay video of the mobile game in a two-dimensional format.

5. The method of claim 1, wherein generating the gameplay video further comprises:
   encoding audio frames of an audio representation of the gameplay in a three-dimensional format;
   encoding video frames of a video representation of the gameplay in a three-dimensional format; and
   combining encoded audio frames and encoded video frames to generate the gameplay video of the mobile game in a three-dimensional format.

6. The method of claim 1, further comprising:
   responsive to the mobile game being played on one or more other computer devices:
      receiving gameplay state information from each of the other computer devices;
      selecting a viewing point captured by one of the computer devices based on the received gameplay state information; and
      generating a gameplay video of the gameplay associated with the computer device that captured the selected viewing point.

7. The method of claim 6, wherein selecting a viewing point captured by one of the computer devices comprises:
   selecting the viewing point based on status of players associated with the computer devices, wherein the status of a player associated with a computer device includes at least one of the player's game score, health, game inventory and game activity level.

8. The method of claim 6, wherein selecting a viewing point captured by one of the computer devices further comprises:
  selecting the viewing point based on occurrence of a pre-specified event associated with playing the mobile game.

9. The method of claim 1, further comprising:
  responsive to the mobile game being played on one or more other computer devices:
    generating a gameplay map of the mobile game played on the computer devices, the gameplay map including information identifying each gameplay video of the mobile game and its associated computer device and the gameplay map represented by a gameplay video selected from gameplay videos associated with the computer devices; and
    updating the gameplay map responsive to progress of the gameplay on the computer devices.

10. A non-transitory computer-readable storage medium storing executable computer program instructions for generating a gameplay video in a cloud computing network, the computer program instructions comprising instructions for:
  receiving gameplay state information from a computer device, the gameplay state information describing a plurality of states of a mobile game played on the computer device;
  rendering the mobile game played on the computer device to produce a rendered gameplay based on the received gameplay state information by reconstructing a video representation of the gameplay of the mobile game, the video representation of the gameplay representing video content of the gameplay of the mobile game, the rendered gameplay representing a viewing point of the mobile game observed from the computer device;
  encoding the rendered gameplay to generate a gameplay video of the mobile game played on the computer device based on the rendered gameplay, wherein at least a portion of video content of the generated gameplay video is different from video content of the rendered gameplay.

11. The computer-readable storage medium of claim 10, wherein the gameplay state information includes changes to a model representing the mobile game played on the computer device.

12. The computer-readable storage medium of claim 10, wherein the computer program instructions for rendering the mobile game played on the computer device to produce the rendered gameplay further comprise computer program instructions for:
  responsive to the mobile game having sound data, reconstructing an audio representation of the gameplay of the mobile game, the audio representation of the gameplay representing audio content of the gameplay of the mobile game.

13. The computer-readable storage medium of claim 10, further comprising computer program instructions for:
  responsive to the mobile game being played on one or more other computer devices:
    receiving gameplay state information from each of the other computer devices;
    selecting a viewing point captured by one of the computer devices based on the received gameplay state information; and
    generating a gameplay video of the gameplay associated with the computer device that captured the selected viewing point.

14. The computer-readable storage medium of claim 12, wherein the computer program instructions for selecting a viewing point captured by one of the computer devices comprise computer program instructions for:
  selecting the viewing point based on status of players associated with the computer devices, wherein the status of a player associated with a computer device includes at least one of the player's game score, health, game inventory and game activity level.

15. The computer-readable storage medium of claim 12, wherein the computer program instructions for selecting a viewing point captured by one of the computer devices further comprise computer program instructions for:
  selecting the viewing point based on occurrence of a pre-specified event associated with playing the mobile game.

16. The computer-readable storage medium of claim 10, further comprising computer program instructions for:
  responsive to the mobile game being played on one or more other computer devices:
    generating a gameplay map of the mobile game played on the computer devices, the gameplay map including information identifying each gameplay video of the mobile game and its associated computer device and the gameplay map represented by a gameplay video selected from gameplay videos associated with the computer devices; and
    updating the gameplay map responsive to progress of the gameplay on the computer devices.

17. A computer system for generating a gameplay video in a cloud computing network, the system comprising:
  a non-transitory computer-readable storage medium storing executable computer program instructions, the computer program instructions comprising instructions for:
    receiving gameplay state information from a computer device, the gameplay state information describing a plurality of states of a mobile game played on the computer device;
    rendering the mobile game played on the computer device to produce a rendered gameplay based on the received gameplay state information by reconstructing a video representation of the gameplay of the mobile game, the video representation of the gameplay representing video content of the gameplay of the mobile game, the rendered gameplay representing a viewing point of the mobile game observed from the computer device;
    encoding the rendered gameplay to generate a gameplay video of the mobile game played on the computer device based on the rendered gameplay, wherein at least a portion of video content of the generated gameplay video is different from video content of the rendered gameplay.

18. The system of claim 17, wherein the gameplay state information includes changes to a model representing the mobile game played on the computer device.

19. The system of claim 17, further comprising computer program instructions for:
  responsive to the mobile game being played on one or more other computer devices:
    receiving gameplay state information from each of the other computer devices;
    selecting a viewing point captured by one of the computer devices based on the received gameplay state information; and generating a gameplay video of the gameplay associated with the computer device that captured the selected viewing point.

20. The system of claim 17, further comprising computer program instructions for:
responsive to the mobile game being played on one or more other computer devices:
generating a gameplay map of the mobile game played on the computer devices, the gameplay map including information identifying each gameplay video of the mobile game and its associated computer device and the gameplay map represented by a gameplay video selected from gameplay videos associated with the computer devices; and
updating the gameplay map responsive to progress of the gameplay on the computer devices.

* * * * *